United States Patent [19]
Sparling

[11] Patent Number: 5,766,451
[45] Date of Patent: Jun. 16, 1998

[54] ANTI-REVERSIONARY FLIUD FILTER ADAPTER WITH REPLACEABLE SEAL ELEMENT

[76] Inventor: Thomas Sparling, 184 Old Julian Hwy., Ramona, Calif. 92065

[21] Appl. No.: 641,736

[22] Filed: May 2, 1996

[51] Int. Cl.$^6$ ............................................. B01D 35/00
[52] U.S. Cl. .................... 210/136; 210/168; 210/181; 210/184; 210/DIG. 17; 123/196 A; 137/854
[58] Field of Search ............................ 210/136, 168, 210/184, 186, 249, DIG. 17, 232, 181; 123/196 A; 137/854

[56] References Cited

U.S. PATENT DOCUMENTS

| | | | |
|---|---|---|---|
| 2,888,141 | 5/1959 | Coates et al. | 210/DIG. 17 |
| 3,224,585 | 12/1965 | Scavuzzo et al. | 210/232 |
| 3,463,317 | 8/1969 | Prier | 210/186 |
| 4,700,670 | 10/1987 | Schade | 210/168 |
| 5,178,753 | 1/1993 | Trabold | 210/186 |
| 5,536,626 | 7/1996 | Baumann | 210/136 |
| 5,548,893 | 8/1996 | Koelfgen | 210/136 |

FOREIGN PATENT DOCUMENTS

| | | | |
|---|---|---|---|
| 1362715 | 8/1974 | United Kingdom | 210/136 |

*Primary Examiner*—Matthew O. Savage

[57] ABSTRACT

An anti reversionary valve assembly with a replaceable anti reversionary valve element for prevention of back flow of lubricant in a machine using fluid pumped through passages for lubrication. The anti reversionary sealing action prevents the drainage of lubricant from passages supplying bearings and high friction areas with lubricant avoiding damages to machinery from dry starts.

16 Claims, 3 Drawing Sheets

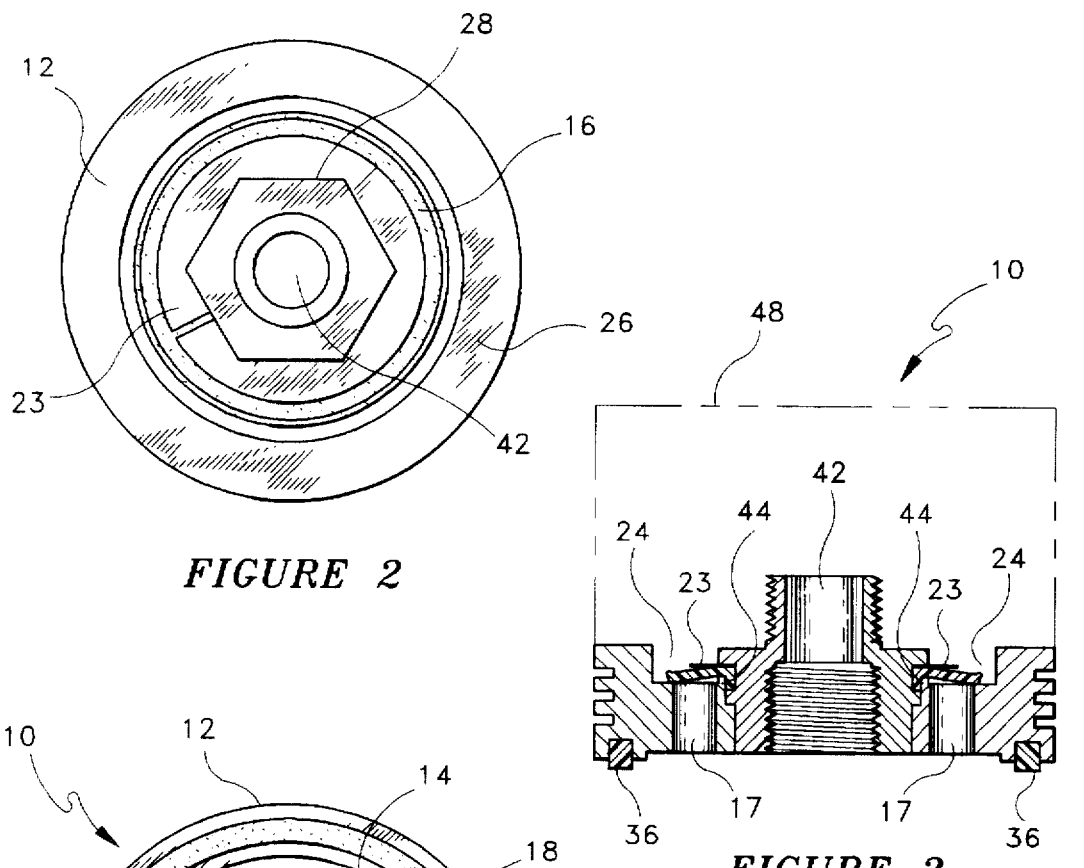
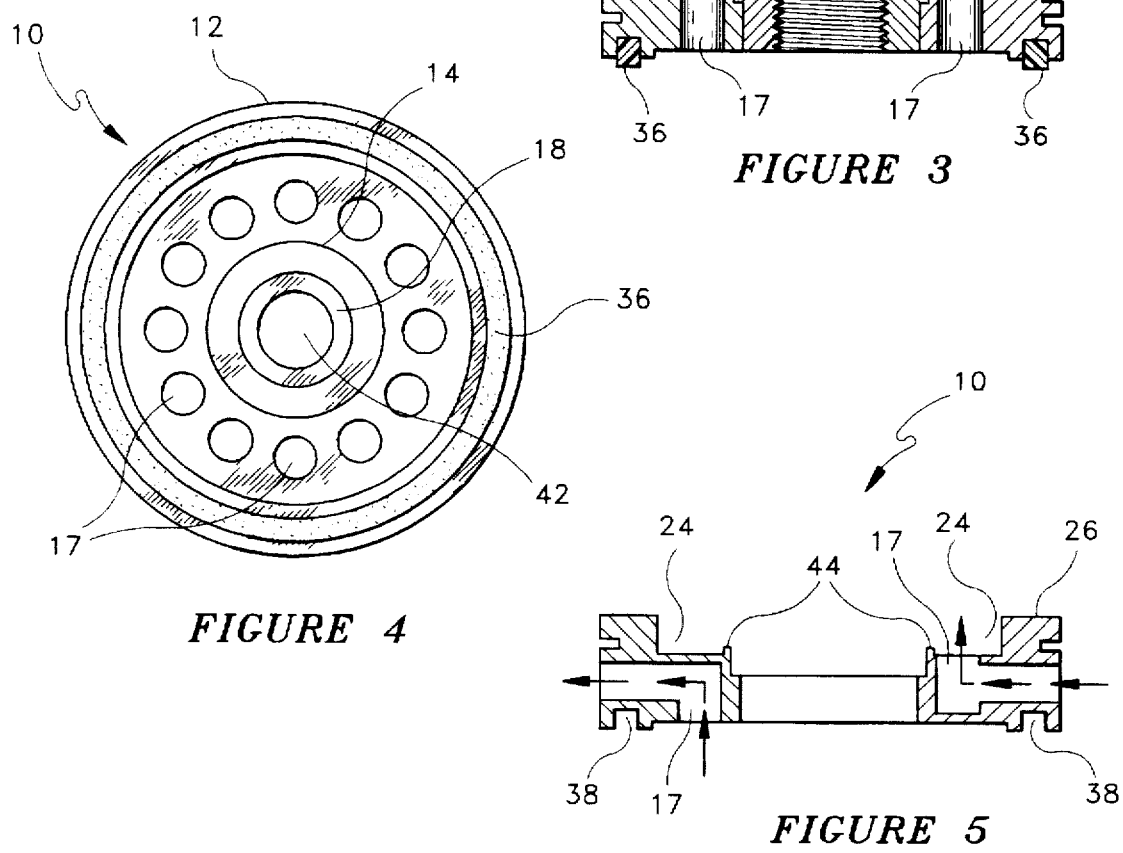

ANTI-REVERSIONARY FLIUD FILTER ADAPTER WITH REPLACEABLE SEAL ELEMENT

BACKGROUND OF THE INVENTION

1. Field of the Invention

This invention relates to oil lubrication systems used on mechanical devices such as internal combustion engines and machinery and equipment which use pressurized lubricants to pumped to bearings and other areas needing lubrication of frictional engagement. More particularly it relates to an in line pressure oil filter adapter which places an anti siphon or anti-drain back valve into the stream of lubricant pumped to lubricate the engine or mechanical device to keep the lubricant from draining out of the lubrication system and oil filter once the lubrication pump providing the stream of lubricant is turned off.

2. Prior Art

Engines and mechanical devices having bearings and other surfaces of high frictional engagement which require constant lubrication while the moving to avoid damage from friction. In the industrialized world most engines and other mechanical devices are commonly lubricated by a pump providing a pressurized stream of lubricant to the bearings and other frictionally engaged surfaces while the engine or other device is in operation. Inherent to such devices is a time lag caused by the time it takes the fluid pump to pump pressurized lubricant to the bearing or other surface needing the lubricant through the internal lubricant passages in the engine or machine to be lubricated. This time lag which occurs generally when the engine or machine is being started after having been idle or non running for some period of time due to back flow of the lubricant fluid from the oil passages leaving air behind which must be pumped to the bearings upon start up of the machinery and fluid pump.

Conventionally used internal combustion engines are typical of devices which are lubricated using a pressurized stream of lubricating fluid which is pumped from the lowest point in the engine, the sump, through passages and tubing, to the bearings and high friction areas of the engine. Once the engine is turned off, gravity tends to siphon the oil in the passages and tubing back down to the sump since it is the lowest point in the engine. The result being empty oil passages which must refill when the engine is again restarted. In turn, the bearings and high friction areas of the engine run for a short period of time at start up, without pressurized lubricant reaching them to cool and reduce friction and resulting wear and tear.

This lack of pressurized lubricant, or oil pressure, at start up can be observed by watching the oil pressure gauge in most autos or the warning light. For a short period at start up, the gauge reads no pressure or the warning light warns of no or low pressure while the pump is refilling the passages to the bearings and other surfaces. It is conventionally recognized that such dry starts cause the majority of internal wear on otherwise maintained engines and machinery.

The automotive industry in particular, recognizing that most of an engines wear and tear occurs at start up, has designed lubricant or oil filters for engine oil and transmission fluid, which employ internal valves to check the back flow of lubricant to the sump. Many automatic transmissions and hydraulically driven mechanisms also use filters similar and sometimes identical to automotive filters and are subject to the same dry start wear and tear.

The anti drain valve, when included in conventional "spin on" oil and fluid filters, is encased inside a metal canister. The existence of the valve itself as well as the quality and integrity of operation of the anti drain valve in such filters cannot be inspected. Some of the cheaper oil filters lack the valve entirely and the unsuspecting buyers of such filters would be unaware of this fact without close inspection of the specifications of such inexpensive filters if they are made available to the buyer. More expensive spin on filters do include some sort of anti drain valve. However, different brands use different variations of such a drain back prevention valve, some of which do not function properly at all, and some of which fail after a short period due to the heat of the lubricant or poor design. Again, the user cannot know if the valve is working or not without destroying the filter to inspect the valve since such an inspection would involve cutting apart the metal filter case rendering it useless.

The automobile or machine owner is thus currently left with a problem with little resolution. To inspect the valve inside the lubricant filter, he or she must destroy the filter since conventional lubricant and spin on filters are sealed canisters which cannot be resealed if opened. Even if the box containing the filter indicates the filter uses an anti drain valve, again the owner does not know the quality of the valve, or if the anti drain back valve is still functioning after use for a few hundred miles. Further, should the owner allow the engine to overheat concurrently overheating the oil therein, it can have a "cooking" effect on some filter anti drain valves not designed to handle such situations. Finally, in the case of ever changing synthetic lubricants and varying lubricant temperatures of different engines and machines, the material from which the anti drain back valve is manufactured may need to be replaced to survive. Synthetic oils have been known to shrink some seals with improper formulations for the material from which they are made. In very hot temperatures, other seals have been known to cook and be destroyed.

There are a number of approaches advanced in prior art which address the anti siphon dilemma in different manners by providing valves to prevent the back flow in the interior of the filter.

U.S. Pat. No. 4,406,784 Cochran, teaches a two piece oil filter adapter wherein the user mounts a mounting block portion of the invention to the engine which then allows for the mount of the second halve of the invention between a spin on oil filter and the mounting block. However, Cochran has no anti drain back valve at all and must rely upon the attached oil filter for that function. As noted earlier, the user cannot be sure conventionally attached filters even have such a back flow valve and if it continues to work after being in use. Further, Cochran teaches a two piece unit which cannot be mounted to many engines with ever tightening engine compartment space requirements.

U.S. Pat. No. 5,362,390, Widenhoefer et al. teaches an oil filter with a sealing flange which is normally in a closed position to prevent back flow. However, Windenhoefer is sealed inside of the filter which precludes inspection and/or change of the back flow preventing sealing flange if new lubricants or damage dictate such a change. Also no materials are taught for the manufacture of the sealing flange in Widenhoefer which are designed to tolerate high fluid temperatures cooking the flange or rendering it inoperable through wear, tear, and loss of elasticity due to heat.

U.S. Pat. No. 5,236,064, Wagoner, teaches a lubricant charging device having a sheet metal reed valve which closes when pressure from a separate pre oiling pump is applied. Wagoner however teaches an object of such a valve is to prevent back flow circulation of the lubricant through the auxiliary pump when the engine is in operation. It serves no purpose when the engine is turned off instead relying upon an electric or other type of pump to pre oil the bearings and passages of the engine prior to start up to relieve dry start wear. Also, the back flow prevention valve as taught in Wagoner is metal which is welded or riveted in a permanent position on the adapter plate, precluding easy replacement or maintenance thereof.

U.S. Pat. No. 4,052,307 Humbert Jr., discloses a universal filter mounting attachment which encompass a spring loaded washer shaped valve which opens under engine oil pressure and closes absent such pressure. As taught, the spring loading of the flat washer type valve has a tendency to cause the valve to warp under the constant heat and pressure of the lubricant opposing the constant pressure of the spring. This leads to failure of the valve when the outside circumference looses its seal due to such warpage. Hidden by the filter attachment plate, the valve is not easily inspected nor changeable if defective. Additionally, Humbert requires that filters used upon it must have a proprietary attachment latch which is not the current industry standard spin on type filter used by millions of autos and machines.

U.S. Pat. No. 5,300,223 Wright, discloses a quick connect/disconnect oil filter which has a spring loaded ball in its base for purposes of anti back flow. As in the aforementioned patents, the valve in Wright is designed to be permanent and not replaceable in the base. Spring loading can score the ball or the ball itself can score the seat causing leakage and eventual failure of the sealing ability of the valve. Such damage is not inspectable by the user due to a hidden location which as taught by Wright is permanently mounted in the base. Additionally Wright depends upon the use of proprietary filter cartridges which preclude the use of widely available industry standard spin on type filters or retrofitting the millions of autos and machines using standard spin on filters.

Numerous other anti-drain back valves are taught for use in sealed canister type oil filters. None however are inspectable without destruction of the canister and filter and many are prone to warpage and failure due to spring loaded designs at their center causing warpage of the valve and failure or from cooking of the material from which the valve is manufactured.

Their thus exists a need for a device which provides users continual anti drain back protection with the ability to use any standard spin on type oil filter which might lack an anti drain back valve or have a poorly designed valve which is prone to failure. Additionally their is a need for such a device which has a valve which may be readily inspected for damage and easily maintained and easily changed if needed for repair or because changing heat or lubricant characteristics require a different valve material to maintain a proper seal. Additionally, there exists a need for such a device which can be used on the millions of standard engines and machines which currently use conventional spin on lubricant filters.

Since most people owning autos don't change their own oil and are at the mercy of commercial services to handles such matters. Such a device would give users confidence that their engines would not be subject to dry starts even if cheap spin on filters lacking anti drain valves or having sub standard valves are used by the common "assembly line" style oil change facilities commercially available.

SUMMARY OF THE INVENTION

In summary, the present invention comprises an oil filter mounting base which is easily mounted to conventional engine blocks between spin on oil filters and the engine. In new engines from manufacturers the separate base would not be required if it were cast into the engine block or it could be included with an inspection plate instead of a filter.

The invention concurrently provides for the prevention of drain back of oil into the engine sump when the engine is not running and pumping lubricant while providing an easily accessible anti reversionary valve assembly for inspection and replacement of the sealing element if required by damage or new lubrication fluid chemistry. It optionally provides anti reversionary characteristics with the same inspectable and replaceable seal to an optional circuit of fluid for cooling or to a reservoir.

The preferred embodiment of the invention features a circular base plate having an aperture at its center and a plurality of oil passages distributed about the circumference of the center aperture. The center aperture in the base plate is of a diameter sufficient to allow it to encompass the standard threaded nipple attachment conventionally used in automotive engines when the nipple is mated to a matching mounting nut about the outside circumference of the nipple.

The mounting nut has a nipple receiving cavity on one end which is threaded to match and receive the outside of the conventional threaded nipple on the engine block. The circumference of the mounting nut about the engine end allows for the insertion of the mounting nut through the center aperture of the base late such that the nut may be tightened onto the threaded nipple to mount the base plate to the engine block. The mounting nut has a circular rib about its outside circumference which is larger than the center aperture of the base plate but smaller than the circumference of the recess about the center aperture. The rib is at a distance from the engine block end to allow the insertion of the mounting nut into the recess at the center of the base plate such that the rib comes in contact with a recess in the front face of the base plate and is therein torqued with a wrench forming a sealing contact with the engine block and the opposite face of the base. However, when used in an OEM application, the base plate would be optional since the engine block itself could be cast or machined with a recess for the seal and mounting nut to reside when installed under a filter or fluid routing cover.

A second, hex shaped rib is distributed about the center section of the mounting nut at a distance from the circular rib to form a seal mount cavity between the two ribs.

The base plate is attached to the engine block about the protruding nipple by spinning the threads at the engine end of the mounting nut over the nipple using a conventional wrench to turn the hex shaped rib on the nut. However a hex shape is not required as any conventional method of providing a manner to grip and turn the nut such as indentations in the side of the rib could be used.

A synthetic rubber seal sandwiched between the engine block and the inside face of the base plate in a circular cavity on the inside face of the base plate. The cavity may not be needed to hold the rubber seal if it were located upon the engine block instead or if it were glued or otherwise mounted to the base plate. The thickness and hardness of the rubber seal is such that when the mounting nut is torqued to the proper tightness, the seal is compressed to form a fluid tight seal between the engine block and the base plate when the circular shaped rib on the exterior of the mounting nut compresses the base plate against the engine block. The seal may be manufactured of any synthetic rubber material such as silicone or neoprene of vinyl in a fashion to hold up to the temperatures, pressure, and type of fluid lubricant in the installation desired.

The distal end of the mounting nut is threaded at its exterior circumference with convectional threads used to on the mouth of conventional spin-on type oil filters allowing for the attachment of any conventional industry standard spin on oil filter thereto.

An anti drain back valve seal is positioned upon the mounting nut in the cavity between the circular rib and the hex shaped rib about the circumference of the mounting nut. The drain back valve is of a circumference to cover all of the oil passages located about the center mounting aperture of the base plate. The valve seal is manufactured of a synthetic material capable of withstanding the heat and pressure of the environment an in a shape such that when compressed by the torquing of the mounting nut upon the base plate, a positive seal is formed. Conventional seal materials such as silicone, neoprene, vinyl, rubber, other such materials capable of holding up in the temperature and fluid and operating conditions of the intended environment can be used. The seal is maintained upon the base plate by the shape and size of the valve seal causing a natural bias in the sealed position upon the base plate.

This seal prevents the back flow of fluid from any oil filter or optional cap or plate mounted to the base plate. This seal occurs whether the oil filter is of cheap manufacture and lacks the valve or has a damaged or inoperable valve hidden from view or repair. The valve seal is easily inspectable upon the removal of the conventional oil filter for regular service. Further, it is easily replaceable should damage somehow occur, or should new lubricant formulations or temperatures require, by simply removing the mounting nut, dismounting the seal by stretching it over the rib, and mounting a new seal in the groove between the circular rib and the hex shaped rib in reverse fashion.

An object of this invention is to provide lubrication systems on internal combustion engines and similar machinery which uses lubricant pumped to bearings and high friction areas, protection against dry start up caused by drained oil passages by eliminating back flow or drain-back of oil from the oil passages feeding the lubrication points.

It is an object of this invention is to provide an anti drain back valve which can be easily mounted in between a conventional spin on oil filter currently in use by millions of autos and machines and an engine or machine using the oil filter.

Another object of this invention is to provide an easily inspectable anti drain back valve for users of engines which use spin on oil filters.

A further object of this invention is to provide an easily serviceable and replaceable anti drain back valve for use in systems using spin on oil filters such that the valve may be changed if somehow damaged.

A further object of this invention is to provide an easily serviceable and replaceable anti drain back valve for use in systems using conventional spin-on oil filters such that the drain back prevention valve may be changed at regular service intervals or if the fluid used for lubrication requires a different valve configuration or material due to changed temperature or corrosion characteristics of fluid itself.

An additional object of this invention is to allow for an in line remote oil cooling device to be added to systems so requiring while maintaining anti drain back capabilities of the invention and the ability for fins for cooling on the device itself.

Another object of this invention is to provide users the ability and peace of mind to used cheap or lower quality spin on oil filters which may be lacking proper anti flow back capabilities by rectifying such inadequacies and related dry start engine wear.

A still further object of this invention is to provide anti drain back protection to automobile owners who use oil change services which may use filters of unknown or inferior quality lacking in anti drain back ability.

Another object of this invention is to provide an auxiliary fluid circuit to route fluid to a cooler or reservoir and back through the back flow seal thus providing anti reversionary sealing to such optional fluid circuits not currently obtainable.

Further objects of the invention will be brought out in the following part of the specification, wherein detailed description is for the purpose of fully disclosing the invention without placing limitations thereon.

BRIEF DESCRIPTION OF DRAWING FIGURES

FIG. 2 is a view of the invention from the filter end showing the hex shaped mounting nut rib and the filter mounting face of the base plate.

FIGS. 3 and 3a are side views of the invention in cut away showing the inlet and outlet apertures and the seal mounted in a cavity formed by the two ribs on the mounting nut further held in position by r ridge on the face of the base plate.

FIG. 4 is view of the invention from the engine or machine face side showing the mounting nut inside the center mounting aperture.

Figure 1:
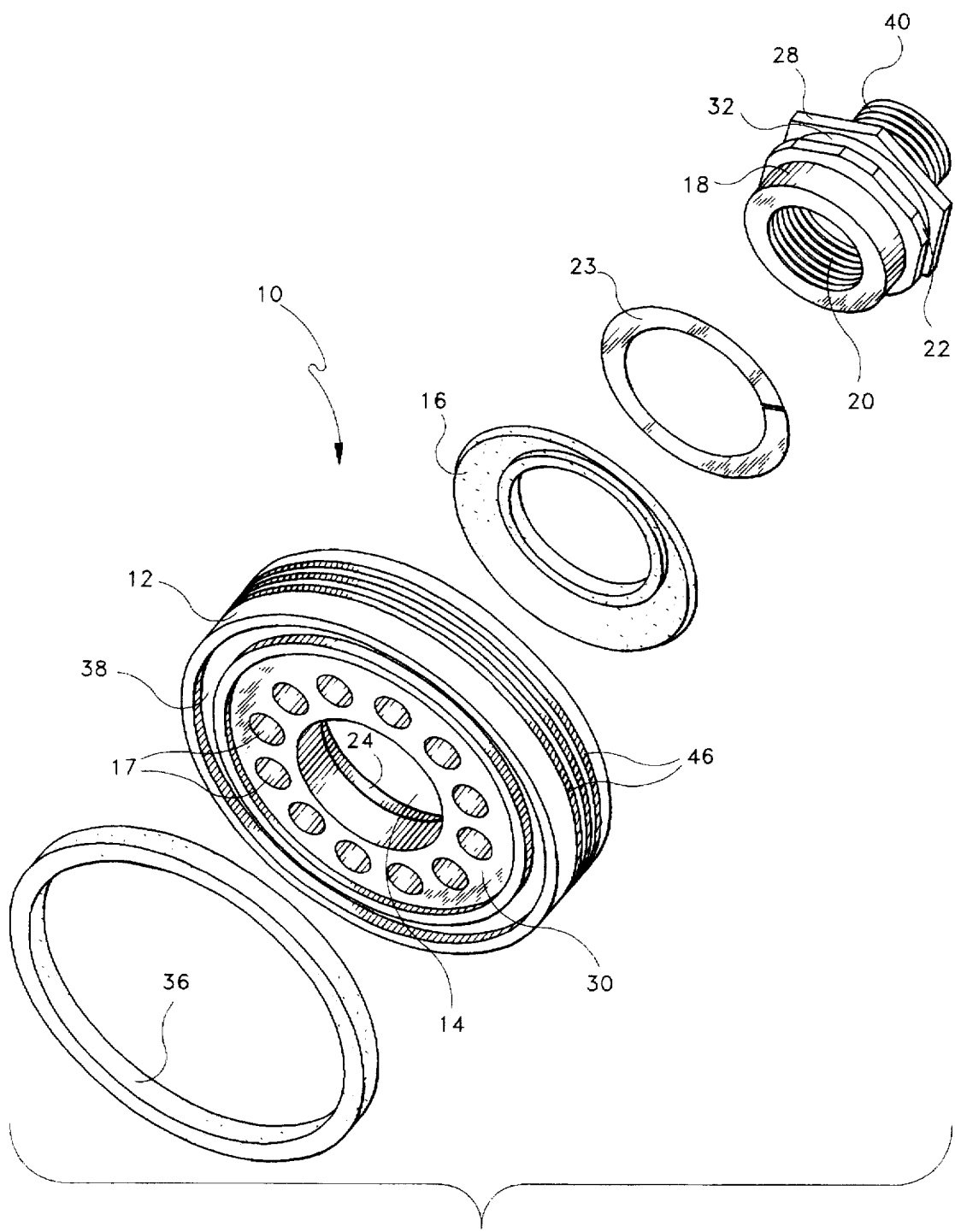
FIG. 1 is perspective view of the invention showing an exploded view of the invention with base plate.

FIG. 5 is a cut away side view of an embodiment of the base plate showing an additional circuit for lubricant to be sent to an external cooler or reservoir and returned to the base plate achieved by plugging one of the inlet apertures on the base plate on the filter face side and one of the inlet apertures on the engine side of the face plate and routing oil through a cooling circuit and back through the base plate to the filter.

DETAILED DESCRIPTION OF A PREFERRED EMBODIMENT OF THE INVENTION

Referring now to the drawing figures:

FIG. 1 is perspective view of the invention 10 showing an exploded view of the invention. This preferred embodiment of the invention features a circular base 12 plate having a center mounting aperture 14 at its center and a plurality of fluid entry passages 17 distributed about the circumference of the center mounting aperture in a position such that the seal 16 covers the fluid entry apertures 17 when properly mounted upon the machine (not shown) upon which the invention is to be used. The number of fluid entry apertures 17 may vary from one to any plurality which will adequately transfer the lubricant to the filter side of the base plate and may vary with different applications. One fluid aperture would be used if the fluid returning to the machine is routed to the sump or elsewhere instead of back through the base 12. The center mounting aperture 14 in the base plate 12 is of a diameter sufficient to allow it to encompass the standard threaded nipple attachment (not shown) conventionally used in automotive engines for the return of fluid.

The mounting nut 18 has a nipple receiving cavity 20 on one end which is threaded to match and receive the outside of the conventional threaded nipple on the engine block or machine 13.

Figure 3A:
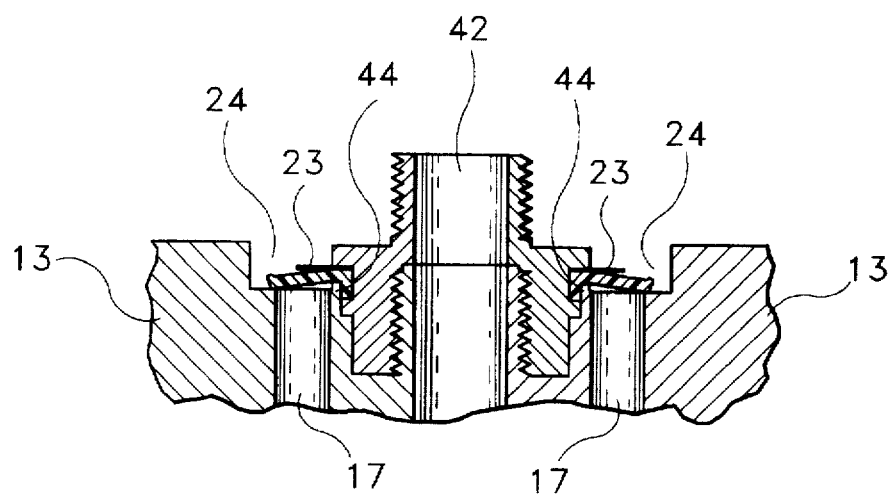

The circumference of the mounting nut 22 about the engine end allows for the insertion of the mounting nut through the center mounting aperture 14 of the base plate 12 such that the nut may be tightened onto the threaded nipple to mount the base plate 14 to the engine or machine block. The mounting nut has a circular rib 22 about its outside circumference which is larger than the center mounting aperture 14 of the base plate 12 but smaller than the circumference of a recess 24 about the center mounting aperture 14 on the filter face 26 of the base plate 12. The circular rib 22 is at a distance from the engine block end to allow the insertion of the mounting nut 18 into the recess 24 at the center of the base plate such that the rib 22 comes in contact with the face of a recess 24 in the filter face 26 of the base plate 12 and is therein torqued with a wrench or appropriate tool (not shown) upon a second hex or appropriate shaped rib 28 with the resulting pressure forming a sealing contact with the engine block or machine face 13 and the opposite face of the base 30. However, when used in an OEM application, the base plate 12 would be optional since the engine block (See FIG. 3a) itself could be cast or machined with an appropriate recess similar to the base plate recess 24 for the seal 16 and mounting nut 18 to reside within when installed under a mating fluid filter (not shown) or fluid routing cover 48.

The second, hex shaped rib 28 is distributed about the center section of the mounting nut at a distance from the circular rib 22 to form a seal mount cavity 32 between the two ribs.

The base plate 12 is attached to the engine block about the protruding nipple by spinning the threaded nipple receiving cavity 20 at the engine end of the mounting nut over the nipple using a conventional wrench to turn the hex shaped rib 28 on the nut. However a hex shape is not required as any conventional method of providing a manner to grip and turn the nut could be used. Optional cooling fins 46 can be added to the circumference of the base if round or to the perimeter of a different shaped base since shapes might be adjusted for different applications.

A seal element 36 such as an O ring or rubber washer or a machined fit of metal parts is sandwiched between the engine block and the inside face of the base plate in a circular annular groove 38 on the engine face 30 of the base plate. This annular groove 38 may not be needed to hold the seal element 36 if it were located upon the engine block or machine face instead or if it were glued or otherwise mounted to the base plate 12. The thickness and hardness of the rubber seal element 36 is such that when the mounting nut 18 is torqued to the proper tightness, the seal 36 is compressed to form a fluid tight seal between the engine block and the base plate 12 when the circular shaped rib 22 on the exterior of the mounting nut 18 compresses the base plate against the engine block inside the recess 24.

The filter end 40 of the mounting nut 18 is threaded at its exterior circumference with convectional threads used to on the mouth of conventional spin-on type oil filters allowing for the attachment of any conventional industry standard spin on oil filter 48 thereto. However it could also be configured to fit any filter by changing the filter end 40 to a configuration to match the desired filter.

An anti drain back valve seal 16 is positioned upon the mounting nut 18 in the seal mount cavity 32. The drain back valve seal 16 is of a circumference to cover all of the fluid entry apertures 17 located about the center mounting aperture 14 of the base plate 12. The anti drain back valve seal 16 is manufactured of a synthetic material capable of withstanding the heat, pressure, and lubricant type, of the environment it is placed and in a shape such that when compressed by the torquing of the mounting nut upon the filter face of the base plate 12, a positive seal. The seal is maintained upon the base plate by the shape and size of the anti drain back valve seal 16 causing a natural bias in the sealed position upon the base plate. Additional bias can be supplied by the positioning of the seal on the mounting nut 18 such that when torqued tight, the nut places pressure upon the rear of the seal 16 at the rear hex rib 18.

The anti reversionary or anti drain back seal 16 prevents the back flow of fluid from the internal passages of the engine or machine, 13 through any base plate mounted oil filter or optional cap. This seal occurs whether the oil filter is of cheap manufacture and lacks its own such valve or has a damaged or inoperable valve hidden from view or repair.

The anti drain back seal 16 is easily inspectable upon the removal of the conventional oil filter for regular service since it is in plain sight. Further, it is easily replaceable should damage somehow occur, or should new lubricant formulations or temperatures require, by simply removing the mounting nut 18 from the engine or machine, dismounting the seal 16 by stretching it over the rib 22, and mounting a new seal mount cavity 32 between the circular rib 22 and the hex shaped rib 28 and remounting to the engine 13 or machines in reverse fashion.

FIG. 2 is a view of the invention from the filter face 26 of the base plate 12 showing the hex shaped mounting nut rib 28 and the filter mounting face 26 of the base plate 12. The anti reversionary seal 16 is easily inspectable with the filter removed. The fluid return aperture 42 where fluid returns to the engine or machine from the filter is shown.

FIG. 3 is a side view of the invention 10 in cut away showing the fluid entry apertures 17 and the anti reversionary seal 16 mounted in a the cavity 32 formed by the two ribs on the mounting nut 18 further held in position by ridge 44 on the face of the base plate. This ridge 44 helps maintain the anti reversionary seal 16 in its position on the mounting nut 18. A deflection ring 23 is also positioned in the seal mount cavity 32 behind the seal 16 from the entry apertures 17 providing additional support for the seal 16. This deflection ring is optional and can be substituted by a stiffer seal 16 or a deflection means inside the rubber washer 16 so long as optimum deflection or bias towards the sealing surface of the filter face is achieved. Fins 46 may serve the double purpose of added cooling of the fluid as well as lightening the invention by elimination of metal or plastic material for the base plate 12.

FIG. 4 is view of the invention 10 from the engine or machine face side of the base plate 12 showing the mounting nut 18 inside the center mounting aperture 14. The fluid return aperture 42 allows for the return of lubrication fluid from the filter to the lubrication circuit inside the engine. The fluid entry apertures 17 are pictured evenly distributed about the center of the base 12. However the number and placement of these apertures 17 are determined by the application on which the invention is to be placed and the amount of fluid to be pumped.

FIG. 5 is a cut away side view of another embodiment of the invention 10 showing the base plate 12 having a recess 24 therein of sufficient depth to allow for the seal 16 and mounting nut 18 to locate therein and permit a filter 48 to mount to the nipple mount 40 and the face of the filter and filter face 26 of the base plate to communicate in a sealed fashion concurrently allowing for the channeled flow of lubricating or other fluids.

An additional fluid circuit for lubricating or hydraulic fluid to be sent to an external cooler or reservoir (not shown)

and returned through the base plate 12 and attached anti reversionary valve and filters is achieved by plugging one of the inlet apertures 14 on the base plate 12 on the filter face side 26 and also one of the inlet apertures 14 on the engine face 30 of the base plate and routing lubricant through a cooling circuit using conventional hose and conventional threaded or other fittings (not shown) and back through the base plate 12 to the filter. Such an arrangement would allow for the addition of lubricant coolers or sumps to the lubrication circuit in modern tightly packed engine compartments without the need for additional mounting brackets or space consuming adapters.

While all of the fundamental characteristics and features of the anti reversionary valve assembly invention having a replaceable anti reversionary valve element have been shown and described, it should be understood that various substitutions, modifications, and variations may be made by those skilled in the art without departing from the spirit or scope of the invention. Consequently, all such modifications and variations are included within the scope of the invention as defined by the following claims.

What is claimed is:

1. An anti reversionary valve assembly for prevention of back flow of fluid in a machine using fluid pumped through passages for lubrication for use in combination with a structure having inlet and outlet openings comprising:

a base having at least one base inlet opening and at least one base outlet opening therethrough for conducting fluid;

a base plate having a machine face, a structure face, and a mounting aperture axially therethrough, said base plate having base plate inlet and outlet openings located therethrough in positions corresponding to said base outlet and said base inlet openings, respectively;

a first base plate sealing means for location between said machine face and said base;

a second base plate sealing means for location between said structure and said structure face;

a mounting nut having a first end and a distal end, wherein the first end of said mounting nut is configured to slide though said mounting aperture of said base plate;

means for cooperative engagement of said first end of said mounting nut with a corresponding base attachment means located upon said base;

means for cooperative detachable engagement of the distal end of said mounting nut with a corresponding structure mount located upon said structure to be used in combination therewith, whereby said structure may be operatively and detachably secured to said structure face of said base plate, with said structure outlet and inlet openings corresponding to said base inlet and outlet openings respectively;

a first shoulder portion located about the exterior circumference of said mounting nut, said first shoulder portion having a circumference larger than the circumference of said mounting aperture, said first shoulder portion positioned between said first end and said distal end of said mounting nut in a location calculated to engage said structure face of said base plate and operatively secure said base plate to said base when said first end of said mounting nut is operatively engaged with said base attachment means, wherein said shoulder portion is formed by a first rib extending around the exterior circumference of said mounting nut;

a seal means removably secured in a seal mount, said seal mount located about the outside circumference of said mounting nut at a location calculated to place said seal means in a position to engage said base plate outlet opening to permit fluid flow from said base plate to said structure through said structure inlet opening while preventing fluid back flow from said structure to said base through said base plate outlet opening when said first end of said mounting nut is operatively engaged with said base plate attachment means, a second rib extending around the exterior circumference of said mounting nut, wherein said second rib is axially spaced from said first rib in a direction towards the distal end of said mounting nut, and wherein said seal mount comprises a circumferential groove formed axially between said first rib and said second rib.

2. The anti reversionary valve assembly as recited in claim 1 wherein said seal means is visible for inspection when said base plate is operatively engaged with said base and said structure is disengaged from said mounting nut.

3. The anti reversionary fluid assembly as recited in claim 2 wherein said structure is a conventional spin on type oil filter.

4. The anti reversionary valve assembly as recited in claim 1 wherein said seal means may be removed from said mounting nut and optionally replaced, when said first end of said mounting nut is disengaged from said base attachment means.

5. The anti reversionary fluid assembly as recited in claim 4 wherein said structure is a conventional spin on type oil filter.

6. The anti reversionary fluid assembly as recited in claim 1 additionally comprising:

a recess located upon said structure face of said baseplate configured to locate said first shoulder portion operatively therein.

7. The anti reversionary fluid assembly as recited in claim 1 additionally comprising:

said base plate return passage is a central bore through said mounting nut communicating with a mounting nut inlet orifice and a mounting nut outlet orifice;

said mounting nut inlet orifice and said mounting nut outlet orifice communicate with said structure outlet opening and said base inlet opening respectively;

a nut mounting cavity located in said outlet orifice of said mounting nut configured to cooperatively engage a base mounting nipple located about said base inlet opening;

a structure mounting nipple located about the inlet orifice side of said mounting nut configured to accept a corresponding structure mounting cavity configured for the removable operational mount of said structure thereto;

whereby fluid flowing to said structure from said base outlet opening through said base plate to said structure returns to said base means inlet opening through the central bore communicating with the inlet orifice the outlet orifice, and the base inlet opening.

8. The anti reversionary fluid assembly as recited in claim 7 wherein said structure mounting nipple is threaded to cooperatively threadedly engage with said structure mounting cavity whereby said structure operatively mates to said base plate in a removable operative engagement when said structure mounting nipple and said structure receiving cavity are cooperatively engaged.

9. The anti reversionary fluid assembly as recited in claim 7 wherein a nut mounting cavity is threaded in a manner to cooperatively threadedly accept said corresponding threaded base mounting nipple whereby said nut mounting cavity operatively mounts to said base mounting nipple in a removable operative engagement concurrently mounting said base plate in a removably operative fashion to said base.

10. The anti reversionary fluid assembly as recited in claim 1 wherein said seal means is a washer.

11. The anti reversionary fluid assembly as recited in claim 1 wherein said structure is a conventional spin on type oil filter.

12. The anti reversionary fluid assembly as recited in claim 1 additionally comprising:

an auxiliary fluid circuit exiting and reentering said base plate.

13. The anti reversionary fluid assembly as recited in claim 1 wherein said base plate has fins about its exterior.

14. The anti reversionary fluid assembly as recited in claim 1 wherein said means for cooperative engagement of said first end of said mounting nut with a corresponding base attachment means comprises:

a threaded cavity on the first end of said mounting nut;

wherein a nipple having nipple threads about its exterior is attached to said base, wherein the nipple threads are dimensioned to cooperatively engage the threaded cavity on said first end of said mounting nut when said mounting nut is rotated;

and wherein said second rib is hex-shaped to cooperate with a wrench whereby a wrench may be used to rotate said mounting nut and engage said nipple threads with said threaded cavity.

15. The anti reversionary fluid assembly as recited in claim 1 wherein said base is the outside surface of an internal combustion engine.

16. An anti reversionary valve assembly for prevention of back flow of fluid in a machine using fluid pumped through passages for lubrication for use in combination with a structure having inlet and outlet openings comprising:

a base plate having a structure face, said base plate being formed as a unitary structure with an internal combustion engine block, a mounting aperture located at said structure face, said base plate having base plate inlet and outlet openings located at said structure face;

a mounting nut having a first end and a distal end, wherein the first end of said mounting nut is configured to slide though said mounting aperture of said base plate;

means for cooperative engagement of said first end of said mounting nut with a corresponding base plate attachment means located upon said base plate;

means for cooperative detachable engagement of the distal end of said mounting nut with a corresponding structure mount located upon said structure to be used in combination therewith, whereby said structure may be operatively and detachably secured to said structure face of said base plate, with said structure outlet and inlet openings corresponding to said base plate inlet and outlet openings respectively;

a first shoulder portion located about the exterior circumference of said mounting nut, said first shoulder portion having a circumference larger than the circumference of said mounting aperture, said first shoulder portion positioned between said first end and said distal end of said mounting nut in a location calculated to engage said structure face of said base plate when said first end of said mounting nut is operatively engaged with said base attachment means, wherein said shoulder portion is formed by a first rib extending around the exterior circumference of said mounting nut;

a seal means removably secured in a seal mount, said seal mount located about the outside circumference of said mounting nut at a location calculated to place said seal means in a position to engage said base plate outlet openings to permit fluid flow from said base plate to said structure through said structure inlet openings while preventing fluid back flow from said structure to said base plate through the base plate outlet opening when said first end of said mounting nut is operatively engaged with said base plate attachment means, a second rib extending around the exterior circumference of said mounting nut, wherein said second rib is axially spaced from said first rib in a direction towards the distal end of said mounting nut, and wherein said seal mount comprises a circumferential groove formed axially between said first rib and said second rib.

* * * * *